(12) United States Patent
Stemen et al.

(10) Patent No.: US 9,152,199 B2
(45) Date of Patent: Oct. 6, 2015

(54) POWER STATE DEPENDENT WAKE-UP ALARM

(75) Inventors: Patrick L. Stemen, Seattle, WA (US);
Timothy W. Liaw, Bellevue, WA (US);
Nicholas S. Judge, Bellevue, WA (US);
Tony Pierce, Renton, WA (US); Libo Tao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1358 days.

(21) Appl. No.: 12/336,127

(22) Filed: Dec. 16, 2008

(65) Prior Publication Data
US 2010/0153765 A1 Jun. 17, 2010

(51) Int. Cl.
*G06F 1/32* (2006.01)

(52) U.S. Cl.
CPC ................................. *G06F 1/3203* (2013.01)

(58) Field of Classification Search
CPC ... G06F 1/3206; G06F 11/3419; Y02B 20/42; Y02B 60/186
USPC .................................................. 713/300, 340
See application file for complete search history.

(56) References Cited

U.S. PATENT DOCUMENTS

| | | | |
|---|---|---|---|
| 6,189,106 B1 * | 2/2001 | Anderson | 713/300 |
| 6,446,213 B1 | 9/2002 | Yamaki | |
| 6,499,102 B1 | 12/2002 | Ewertz | |
| 6,567,931 B1 | 5/2003 | Jue | |
| 6,601,178 B1 | 7/2003 | Gulick | |
| 6,760,850 B1 | 7/2004 | Atkinson | |
| 6,854,064 B2 | 2/2005 | Ahn | |
| 7,228,444 B2 | 6/2007 | Westerinen | |
| 2005/0041351 A1 * | 2/2005 | Dunstan | 361/92 |
| 2006/0248364 A1 * | 11/2006 | Gutman et al. | 713/300 |
| 2007/0162582 A1 | 7/2007 | Belali | |
| 2008/0016379 A1 * | 1/2008 | Nijhawam et al. | 713/320 |
| 2008/0162968 A1 * | 7/2008 | Breen et al. | 713/323 |
| 2009/0327774 A1 * | 12/2009 | Jeyaseelan et al. | 713/320 |

OTHER PUBLICATIONS

Dunnihoo, J. et al., "SoftPower Management (SPM) with SMSC 93X Ultra I/O," 2004, http://www.smsc.com/main/anpdf/an69.pdf.
(Continued)

*Primary Examiner* — Kim Huynh
*Assistant Examiner* — Brandon Kinsey
(74) *Attorney, Agent, or Firm* — John Jardine; Kate Drakos; Micky Minhas

(57) ABSTRACT

A method of operating a computing device to allow events to be conditionally executed based on a power state of the device at the time of execution of the events. Conditional execution may be implemented using multiple timers, each associated with a power state. A timer such as an "AC timer" or a "DC timer" associated with a respective power state may be used to wake up the device when, upon expiration, or time-out, of the timer, a current power state of the device and the power state associated with the timer match. An Advanced Configuration Power Interface (ACPI) may be employed to abstract implementation of the timers from underlying hardware of the device. The operating system and software applications may request establishing wake-up behavior of the device as commands to program conditional events, which may then be translated into commands to embedded controller to set the timers.

19 Claims, 9 Drawing Sheets

(56) References Cited

OTHER PUBLICATIONS

IT168.com, "Power Management Setup," 2006, http://guide.it168.com/files/7308/7308003002006.asp.

Microsoft, "Optimizing Windows Vista Platforms for Energy Efficiency," May 1, 2007, http://download.microsoft.com/download/0/0/b/00bba048-35e6-4e5b-a3dc-36da83cbb0dl/Optimize_Power.doc.

* cited by examiner

POWER STATE DEPENDENT WAKE-UP ALARM

BACKGROUND

Computer devices conventionally operate using an alternating current (AC) power source. A mobile computer device, such as a laptop, additionally may operate with power supplied by a battery providing direct current (DC) power. Regardless of whether a device is using AC or DC power, it may implement one or more "sleep" modes in order to save power.

In a sleep mode, one or more components of the device may be disabled. For example, a screen or other display device may be turned off to implement a sleep mode. Other components such as a processor or wireless transceiver may be shut down. In some instances, devices implement different sleep levels, with successively more components turned off in each deeper sleep mode.

A device may enter a sleep mode in one or more ways. If a device has not been in use for a certain time, it may automatically enter a sleep mode. The device may also enter a sleep mode upon a user input (e.g., pressing of a pause or standby button). To exit the sleep mode and resume normal operations, the device transitions to an active mode, or wakes up.

Different events may trigger a device to transition from a low power mode to another power mode. For example, an event such as moving a computer mouse, pressing a key on a keyboard or receiving a message may cause the device to "wake up" and enter the active mode. Also, the device may have a timer that causes the device to wake up when the timer expires. When the device wakes up, it can perform scheduled maintenance of software or execute applications (e.g., to record a video program). In a mobile device operating on a battery, transition from a low power mode to a lower power mode may be performed automatically.

On known computer platforms, Operating System Power Management (OSPM) may direct programming of the wake-up timer. The OSPM can program an alarm for an event and may then control transitioning of the platform to a wake-up mode by communicating with the platform Real-Time Clock (RTC). When a current time of the computer device matches the alarm time, the RTC causes the device to wake up. Conventionally, one RTC alarm may be programmed at a time.

The RTC alarm may be implemented by an Advanced Configuration and Power Interface (ACPI)-enabled computer device. Computer devices increasingly employ ACPI that is a standard specification providing power control and management between the hardware platform and OSPM. ACPI is implemented by the platform hardware and firmware as well as by OSPM and defines interfaces for power management and monitoring that are presented to an operating system (OS) in a hardware-independent manner. A computer device employing ACPI can be placed in one of several power states. In ACPI-compliant devices, the Basic Input/Output System (BIOS), hardware and associated power management components use a standard approach that enables the OS to manage transitions between different power states.

Conventionally, the RTC alarm wakes the computer device regardless of a current operating power source. Thus, the computer device may wake up from a sleep mode when the device is powered by an AC power source or a battery. As a result, the RTC alarm may expire when a mobile device operating on the battery is in a thermally constrained environment, such as an overhead compartment on an airplane or in a carrying bag. In such scenarios, after waking up, the mobile device does not transition back to a sleep mode and may overheat. Overheating can degrade performance and can damage underlying hardware. Moreover, a user experience may be compromised because the battery may discharge sooner than expected by a user who is then not able to use the computer device.

A known solution to the above problem is to prevent the RTC alarm from waking a device from a sleep mode when the device operates on a battery power.

SUMMARY

The inventors have appreciated that operation of a computing device can be improved by making transitions of the device from a sleep to a wake-up mode conditional on a current power state of the computing device. This capability allows a device to have different wake-up behavior depending on whether it is operating on AC or DC power. Control of such a process may be performed by accepting requests for establishing wake-up behavior based on the current power state at the time the request is to be executed. The wake-up behavior may be established by programming multiple timers, each associated with a power state. Upon expiration, or time-out, of a timer associated with a power state, a suitable hardware component of the computing device may trigger the computing device to wake up if the current power state of the device and the power state associated with the timer match.

The inventors have further appreciated that operation of hardware or firmware component(s) such as an RTC alarm of a computing device effecting a waking up of the device may be controlled using an interface that abstracts the hardware or firmware implementation of the alarm from the OS (e.g., an Operating System Power Management) of the device. Thus, some embodiments of the invention utilize the ACPI power management specification for defining one or more timers each associated with a power state. The ACPI provides control methods that may be used to implement the timers and to control operation of the alarm based on a current power source of the computing device. As a result, the OS itself or various software applications may request establishing wake-up behavior based on a power state.

According to some embodiments of the invention, utilizing timers used to wake up a computing device based on its current power state may allow the device to wake up from a sleep mode to transition from one of low power modes to a lower power mode. For example, when a mobile computing device placed in a sleep mode is operating on a battery, the computing device may wake up in order to transition to an even deeper sleep mode where power consumption of the device is lowered further. Thus, the battery power of the device may be further saved.

In some embodiments of the invention, to reduce power consumption of a computing device operating in an AC or DC power states and save its battery life, some embodiments of the invention provide at least an "AC timer" and a "DC timer" for controlling waking up of the device. The AC and DC timers may trigger a controller or other hardware component to wake up the device based on whether the device is operating using an AC or DC power source, respectively. These timers may be separate physical timers on the device that run even in low power modes. Though, virtual timers, based on a smaller number of physical timers, may alternatively be used.

According to some embodiments of the invention, when a timer associated with a power state expires, the computing device may determine whether to wake up depending on its current power state. Thus, the current power state of the computing device may be monitored and compared, upon a time-out of the timer, to a power state associated with the timer. For example, in embodiments where the AC and DC timers are implemented, when the AC timer expires, the computing device wakes up only when the current power source is an AC power source. Similarly, when the DC timer expires, the computing device wakes up only when the current power source is a DC power source such as battery.

Timers associated with power states such as, for example, the AC and DC timers, may be set and operated based on the power source being used by the device. The computing device may monitor the power source in use and track how much time has passed since switching from one power source to another. In some embodiments of the invention, when a timer such as, for example, an AC timer, expires but the computing device is operating on a battery, the AC timer may be restarted without triggering an alarm. In other embodiments, when a power source of the computing device changes from AC to DC while the AC timer has been started, the computing device stops running the AC timer, which may be resumed when the power source changes again, from DC to AC. A similar approach applies to the DC timer. Other implementations of operation of the multiple timers depending on the power source of the computing device may be employed.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
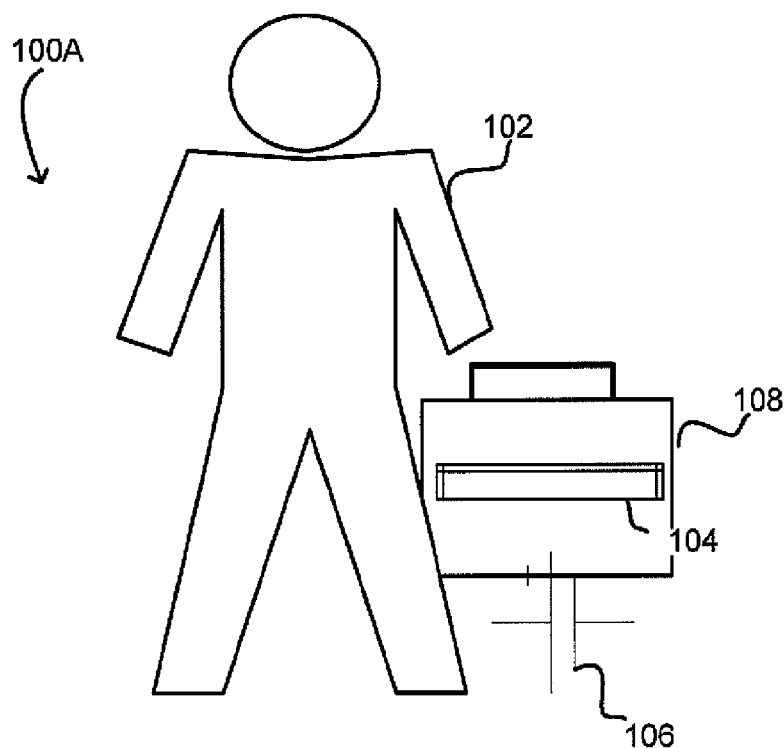
FIGS. 1A and 1B are sketches of environments in which some embodiments of the invention may be implemented.

The inventors have recognized and appreciated limitations of known power management systems that prevent a hardware alarm, such as an RTC alarm, from waking the device from a sleep mode when the device operates on a DC battery power. A limitation of such an approach is the consequence that the device may not wake up to transition from a low to a lower power mode, which is desired to save the battery power. Therefore, a computing device situated in a possibly constrained environment may not transition from one low power mode to another, which increases system power consumption thus adversely affecting the battery life. More generally, such approach limits the ability of the device to reliably provide functionality based on timed wake-up events. For example, a device cannot be used as an alarm clock or to provide other functionality requiring automatic wake up of the computing device operating on a battery.

The inventors have appreciated that a timer determining wake-up behavior of a computing device may be associated with a power state of the device. Thus, the computing device placed in a sleep mode may be instructed to conditionally wake up using a command generated based on the timer. Any suitable components in a kernel mode of an OS of the device or by various software applications running in a user mode of the OS may request the wake-up behavior of a computing device to be established.

According to some embodiments of the invention, the computing device may wake up when, upon expiration, or timeout, of a timer associated with a power state, a current power state of the device and the power state associated with the timer match. When the power states do not match, different adaptive mechanisms may be employed, including leaving the device in a sleep mode.

The inventors have further appreciated that multiple timers, each associated with a power state, may be defined via an interface abstracting software implementation of the timers from hardware components of the computing device receiving commands to wake up the device. Some embodiments of the invention may provide for defining timers independently of the underlying hardware of the device. Thus, software using the timers may be employed for establishing wake-up behavior of different hardware systems. The interface abstracting hardware components of the device from components such as the Operating System Power Management (OSPM) of the OS defining the timers may be implemented using the ACPI specification. Control methods of the ACPI may be used to program the timers in response to requests for establishing wake-up behavior of the computing device.

Requests to establish wake-up behavior received by the OS of the computing device may be used to program timers defined using the ACPI specification. Each request may include a value of the timer comprising a time defined in any suitable increments, such as seconds, minutes, hours, days, months and/or years. Each request may also have associated attributes, such as a power state or states of the device upon expiration of the timer in which the expiration of the timer should generate an alarm. The OSPM or other component(s) of the OS of the device may provide the timers programmed in accordance with the requests to an interface, such as an ACPI interpreter, which then translates the timers into commands to underlying hardware of the device. For example, an RTC alarm may be employed to instruct transitioning of device's hardware components into a wake-up mode using timers each associated with a power state according to some embodiments of the invention. The RTC alarm may be implemented, for example, using an embedded controller, a baseboard management controller or in any other suitable way.

Figure 1B:
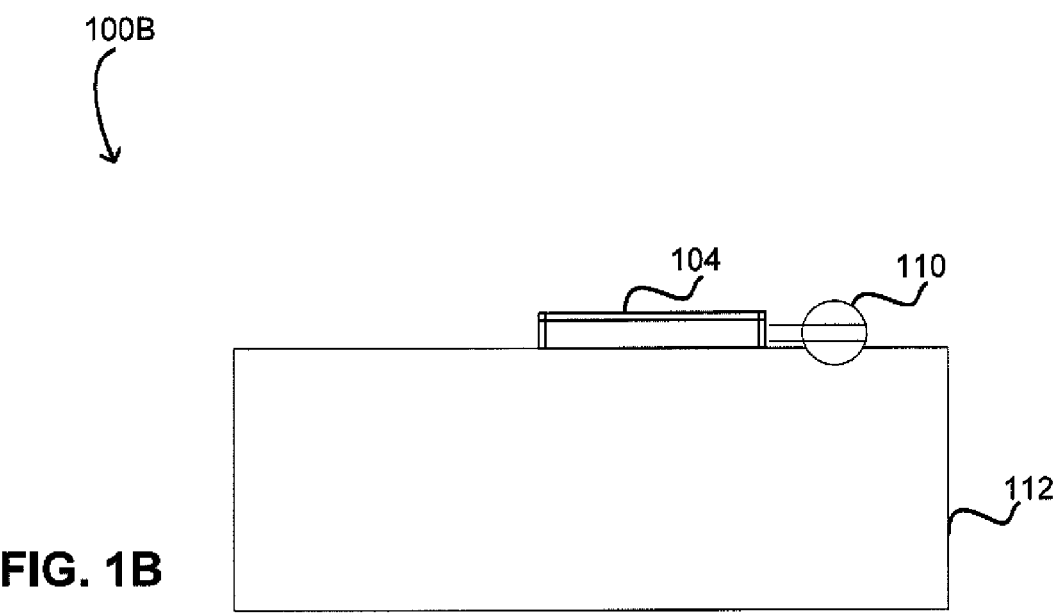

FIGS. 1A and 1B illustrate environments in which some embodiments of the invention may be implemented. FIG. 1A shows an environment 100A where a user 102 of a mobile computing device such as, for example, a laptop 104, is located beyond the reach of an AC power source. In FIG. 1A, laptop 104 is schematically shown in a closed configuration. Here, laptop 104 is operating using a DC power source 106 such as, for example, a battery. When not actively used by user 102, laptop 104 may be placed in a sleep mode to save its battery power. In one embodiment, laptop 304 may be placed in different power modes which may provide different levels of saving power. For example, in a lowest power mode, the clock of the CPU of laptop 304 may be stopped. Laptop 104 may enter these sleep modes either automatically or in response to a user input.

In the example illustrated, laptop 104 may be located in a constrained environment such as a carrying bag 108, shown by way of example only. Also, laptop 104 may be located in other constrained environments such an overhead compartment in an airplane, a trunk of an automobile or in any other enclosed space. When laptop 104 is in a sleep mode, user 102 may cause it to wake up, for example, by pressing a power button or by opening a lid of the laptop. Laptop 104 may also automatically enter a wake-up mode on certain events.

Automatic waking up of laptop 104 in enclosed environments where it may be thermally constrained may not be desirable because, after waking up, the laptop may not return to a sleep mode. Consequently, the laptop may become overheated, which adversely affects its operation and may cause damage of its operating components. Moreover, this may lead to a premature discharge of the laptop's battery, which results in user dissatisfaction with the laptop's performance as a mobile device. At the same time, as described above, it may be desirable to control waking up of laptop 104 when it operates on DC power source 106. For example, when user 102 utilizes an application program such as Microsoft® Outlook program that generates reminders of scheduled events or implements an alarm clock functionality of laptop 104, it is desired to automatically wake laptop 104 for such timed events even when it is using a DC power source. Furthermore, to save battery power, it may be desirable to wake up laptop 104 so that it may transition from a low power mode to a lower power mode.

FIG. 1B shows an environment 100B where laptop 104 is located within the reach of an AC power source. As an example, laptop 104 that operates on an AC power source 110 may be located on a desk 112. Laptop 104 is schematically shown in a closed configuration. When not in use, laptop 104 may either automatically or upon a user input be placed in a sleep mode to reduce its power consumption. In such scenarios, it may also be desirable to control wake-up behavior of laptop 104 to transition the device to a wake-up mode on certain events (e.g., to automatically download video data, upon an arrival of an electronic message, etc.) or to perform routine maintenance of the device.

To control waking up of a computing device such as, for example, laptop 104, some embodiments of the invention enable the computing device to program one or more timers each associated with a power state. Thus, to prevent waking up of laptop 104 when it operates on a battery and may be located in a thermally constrained environment, an AC timer may be programmed to cause, upon its time-out, to wake up laptop 104 only when a current power source of laptop 104 is an AC power source (e.g., AC power source 110). Therefore, when the AC timer is programmed, laptop 104 wakes up when it operates on an AC power source, as shown in FIG. 1B. Further, a DC timer may be programmed to wake up laptop 104 when it operates on a DC power source, as shown in FIG. 1A. For example, to utilize an alarm clock functionality of laptop 104 in an environment such as illustrated in FIG. 1A, the DC timer may be employed to set the alarm clock. By providing a DC timer, wake up in a DC mode may be employed selectively, and can be limited, for example, to scenarios in which the laptop will quickly return to a sleep mode. It should be appreciated that other timers associated with other power states may be programmed to control wake-up behavior of the computing device. For example, a timer used to wake up the device regardless of a power source may be programmed.

In some embodiments of the invention, a computing device (e.g., laptop 104) may be an ACPI-compliant device running an ACPI-compliant operating system. The ACPI enables managing power of the computing device using the device's OS. In these embodiments, suitable component(s) of the OS such as, for example, OSPM, may be used, upon a request, to program one or more timers associated with a power state of the device. To program the timers, the component(s) may utilize control methods of the ACPI that provide ACPI's extensibility. An ACPI control method may be used to define a way to access and control system hardware of the computing device. In embodiments of the invention employing a Microsoft® Windows® operating system, the ACPI control methods may be written in the ACPI Machine Language (AML) and may be interpreted by an ACPI driver. Though any suitable implementation may be employed.

In the ACPI-compliant device, the request to generate a timer according to some embodiments of the invention may be provided by any suitable component(s) within the computing system. For example, the OS may provide a request for establishing wake-up behavior based on a power state. Further, components such as a display, I/O devices, a graphics controller and any other components adapted to regulate their power consumption may also request establishing wake-up behavior based on a power state. Moreover, any software applications may provide a request for programming timers associated with a power state. Such a request, for example, may be made using known extensibility features of the ACPI. Those features may be used to define a timer object and associated methods to access that object. However, any suitable approach may be used to define timers. Moreover, it is not a requirement that the timer objects be defined dynamically by components executing on a device. The timer objects may be predefined as part of the OS, hardware components or other components on a computing device.

The timers programmed by the OS may be communicated to suitable component(s) within underlying hardware or firmware of the computing device via an interface that abstracts implementation of the OS from the component(s) that effect waking up of the computing device. In some embodiments, such interface may be an ACPI interpreter. The interpreter may provide abstraction by mapping commands relating to the timer objects to specific commands that control components within hardware such as hardware 216 shown in FIG. 2.

Figure 2:
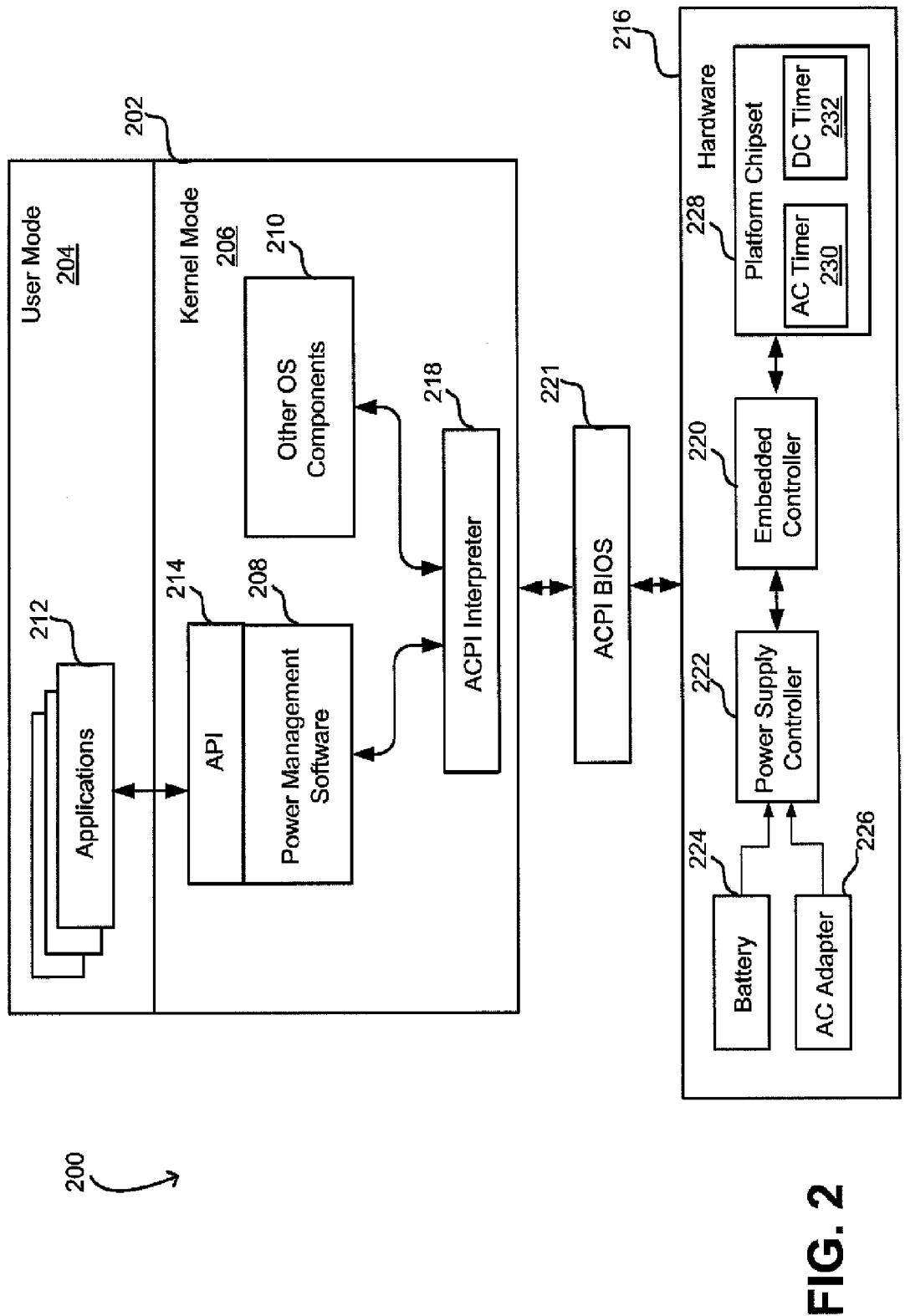
FIG. 2 is a block diagram of components within a computing device configured to operate using multiple power sources according to some embodiments of the invention.

FIG. 2 illustrates a computing device 200 in which some embodiments of the invention may be implemented. Computing device 200 includes an OS 202 comprising a user mode 204 and a kernel mode 206. As discussed above, a component of OS 202 such as, for example, a power management software component 208 may be used to receive a request to establish a wake-up behavior based on a power state. In some embodiments of the invention, power management software component 208 may be one or more components of the OSPM. The request may be received from any suitable component of OS 202. For example, any of OS components shown by way of example only as other OS components 210 may provide the request. Furthermore, the request may be provided by one or more of applications 212 in user mode 204. Applications 212 include software applications that may access components in kernel mode 206 to perform various tasks. Requests from applications 212 for establishing a wake-up behavior may be provided, for example, via an interface such as an API 214. It should be appreciated that each application may request multiple timers. Furthermore, multiple applications may request one or more timers via API 214.

A request received by power management software component 208 relating to a power state dependent unction may include at least a time value indicating the time of a wake-up event (e.g., a certain number of seconds from the present time or from a power transition) and an associated power state, as described in more detail below. Such a request may be in the form of an input command including a time value and an associated power state in which computing device 200 should wake up.

In some embodiments of the invention, OS 202 may comply with the ACPI specification. The ACPI may be used to abstract hardware components (e.g., an alarm such as an RTC alarm) generating waking up interrupts from OS 202. In such embodiments, power management software component 208 may execute control methods of the ACPI to establish the requested wake-up behavior by programming one or more timers each associated with a power state. Thus, timers such as an AC timer and/or a DC timer associated with an AC and a DC power sources, respectively, may be defined. Also, a timer which may be referred to as an "Any power source" timer, may be programmed that is used to wake up the programming device regardless of a current power state. Furthermore, any other suitable timers associated with a power state and variations of power state(s) can be programmed upon a request.

Because the timers are abstracted from the hardware used to implement them, the timers may be implemented in any suitable was and may each be physical timers or virtual timers or a mix of physical and virtual timers may be used. For virtual timers, for example, a common controller may receive requests to program events for multiple virtual timers. The controller may order the events and program one or a small number of physical timers to time out for the events in order. At each time out, the controller may determine and initiate the appropriate action and set the timer for the next event for any of the virtual timers.

Regardless of how the timers are implemented, the timers may be programmed by generating commands based on the input commands received by power management software component 208. OS 202 may communicate information on the programmed timers to hardware 216 of computing device 200 via an interface that abstracts OS 202 from implementation of an alarm in hardware 216. In embodiments of the invention employing the ACPI specification, power management software component 208 may execute hardware-specific instructions provided by APCI control methods to communicate with an embedded controller or other hardware component(s). It should be noted that one or more components within hardware 216 may be implemented as firmware components. The interface abstracting hardware implementation of an alarm from OS 202 may be an ACPI interpreter 218 which may provide, for example, via ACPI BIOS 221, commands to suitable hardware component(s) such as an embedded controller 220. ACPI BIOS 221 component is shown by way of example only to illustrate that, in this example, computing device 200 is ACPI-compliant. Embedded controller 220 may include the RTC alarm or any other suitable components. Moreover, it should be appreciated embedded controller 220 may comprise any suitable component such as a baseboard management controller or any other controller adapted to generate, in response to respective commands, interrupts to wake up the computing device.

To implement wake-up behavior according to some embodiments of the invention, embedded controller 220, which performs control functions in response to a timer timing out, may obtain a current power state (e.g., an AC power state, a DC power state, a combination of the AC and DC power states or any variation of the AC and/or DC power states). Such information may be obtained from a power supply controller 222 in the example shown in FIG. 2. In the example illustrated, power supply controller 222 is coupled to a battery 224 and an AC adapter 226 to monitor a current power source of computing device 200. It should be appreciated that battery 224 and AC adapter 226 are shown coupled to power supply controller 222 for illustration purposes only, but other components providing an indication of a power source being used may supply power state information. Embedded controller 220 also receives events from the timers programmed in response to requests from power management software component 208. Embedded controller 220 may cause computing device 200, upon expiration, or a time-out, of a timer from the programmed timers, to transition from a sleep mode to a wake-up mode. This transition may be triggered using known mechanisms within a computer or may occur in any other suitable way.

To determine whether to generate a command to wake up computing device 200 upon the expiration of the timer, embedded controller 220 may compare a current power state with a power state associated with the expired timer. Thus, when the current power state and the power state associated with the expired timer match, embedded controller 222 may generate an interrupt or assert a similar hardware based signal to wake up a suitable component of hardware 216 including a processor executing power management software 208 or other components of the OS or software applications (212). In FIG. 2, platform chipset 228 is shown by way of example only to receive the interrupt. Platform chipset 228 is shown to comprise an AC timer component 230 and a DC timer component 232 that illustrate that these two timers may be utilized to wake up the chipset from a sleep mode. It should be appreciated that any suitable component of computing device 200 such as the CPU, a subset of the CPU, platform chipset, or any other suitable circuit may receive the interrupt instructing it to wake up.

In embodiments of the invention where computing device 200 is a mobile device operating on a battery such as a laptop (e.g., laptop 104), computing device 200, when in a sleep mode to save battery charge, may be instructed to wake up to then transition to a lower power mode to further save the battery charge. This and other functions may be controlled by power management software 208 or other components that become operational as a result of waking up the computer. It should be appreciated that computing device 200 shown in FIG. 2 may include any other suitable components as embodiments of the invention are not limited to components illustrated in FIG. 2.

As discussed above, some embodiments of the invention utilize an interface that abstracts implementation of the OS from underlying hardware where an alarm is implemented in any suitable way. The interface such as an ACPI interpreter may be used to translate one or more requests for a power state dependent respond at a specified time generated by a suitable component of the OS. These requests may be translated to specific commands to embedded controller 220 or other components.

Figure 3:
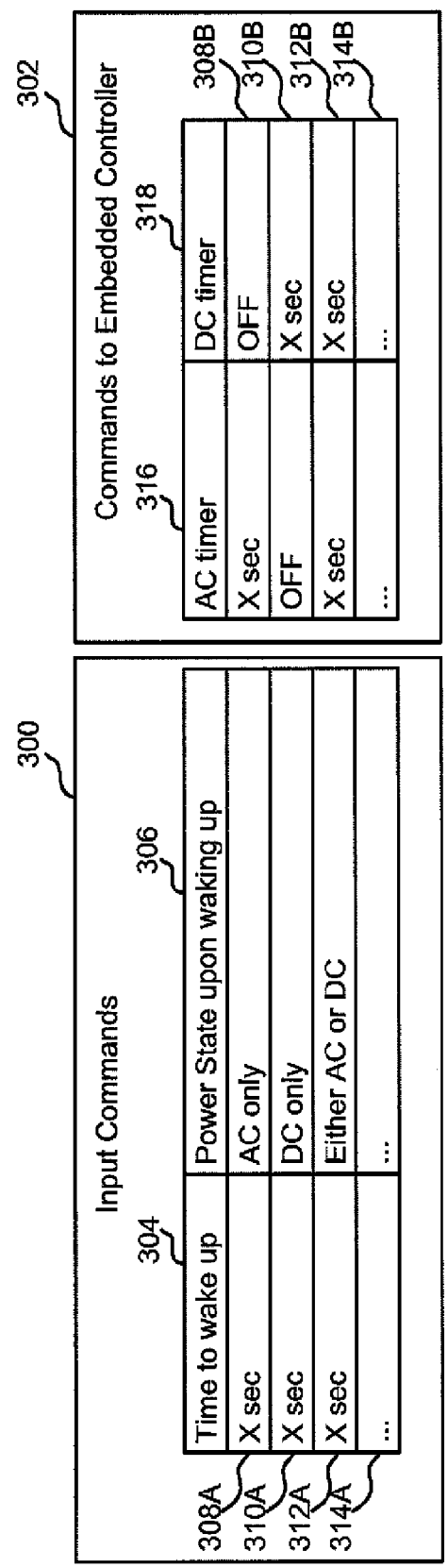
FIG. 3 illustrates input commands to an operating system used to generate respective commands to wake-up hardware component(s) according to some embodiments of the invention.

FIG. 3 illustrates an example of input commands 300 received by power management software component 208 and respective commands 302 to embedded controller 220 generated using input commands 300. In this example, input commands 300 include different event times collectively illustrated by way of example only as Time to Wake up 304. A Power State upon Waking up 306 may be associated with each Time to Wake up 304. At the specified time, if the Power State upon Waking up 306 and a current power state of the computing device match, the computing device may be instructed to enter a wake-up mode.

In FIG. 3, input commands 300 are shown to include commands defined in rows 308A-314A. Thus, a row 308A specifying a time upon waking up in a number of seconds as "X sec" for an "AC only" power state upon waking up, a row 310A specifying a time upon waking up in a number of seconds as "X sec" for a "DC only" power state upon waking up, and a row 312A specifying a time upon waking up in a number of seconds as "X sec" for an "Either AC or DC" power state upon waking up. A row 314A illustrates that time values for other power states may be defined as well.

It should be appreciated that the value of the time to wake up is shown in seconds by way of example only and may be defined in any suitable format. For example, the value may be defined in minutes, hours, days, months and years. Thus, each timer may be used to make up the computing device more than 24 hours after the timer has been started. For each timer, a time to wake up may indicate duration of time required to pass from setting up the timer upon its expiration, or a timeout. In some embodiments of the invention, a timer associated with a power state may be set when a computing device switches to a power state required to match the power state associated with the timer and required to match the associated power state upon the expiration of the timer.

An ACPI interpreter (e.g., ACPI interpreter 218) may translate timers generated using input commands 300 into commands to an embedded controller that may then use the commands to generate interrupts to wake up the computing device. In the example of FIG. 3, two timers are used to implement such commands, an AC timer and a DC timer. Accordingly, the input commands 300 are translated into commands for these two timers. The embedded controller may then generate the interrupts when an internal timer of the computing device matches a time to wake up specified in a timer and the current power state matches a power state upon waking up associated with the timer. Commands provided to power management software component 208 may be used to generate respective commands 302 to embedded controller. In the example illustrated, commands to embedded controller 302 are shown by way of example only as values 316 of an AC timer and values 318 of a DC timer. Values of a timer may be defined in fields of a suitable data structure for the timer. In row 308B, for the AC timer, a command including a number of seconds shown as "X sec" for the timer may be generated from the command in row 308A. In this case, the DC timer is not set, which is shown as a value "OFF" for the DC timer in row 308B. The command in row 310A of input commands 300 may be used to generate a command including a value "OFF" for the AC timer and a number of seconds shown as "X sec" for the DC timer, as shown in a row 310B. FIG. 3 also shows that the command in row 312A may be used to generate a command including values in a number of seconds shown as "X sec" for both the AC and DC timers, as shown in a row 312B. A row 314B illustrates that other values for the AC and DC timer may be generated based on different input commands to power management software component 208 shown as row 314A.

As discussed above, some embodiments of the invention utilize control methods of the ACPI to define timers each associated with a power supply mode. A request may be provided by any suitable component of a computing device that has been placed in a sleep mode to save its power consumption. Upon expiration of a timer, information on a power supply source in use by the computing device is obtained, and the information is used to compare current power state of the device with a power state associated with the expired timer. When the modes match, the computing device may be instructed to wake up. Otherwise, in some embodiments of the invention, the expired timer may be reset. In other embodiments of the invention, a different adaptive approach may be utilized in which a timer stops counting when a power supply source of the computing device is not using a power supply associated with the timer. The timer, once stopped, may resume running if the power supply switches to the power state associated with the timer.

Figure 4:
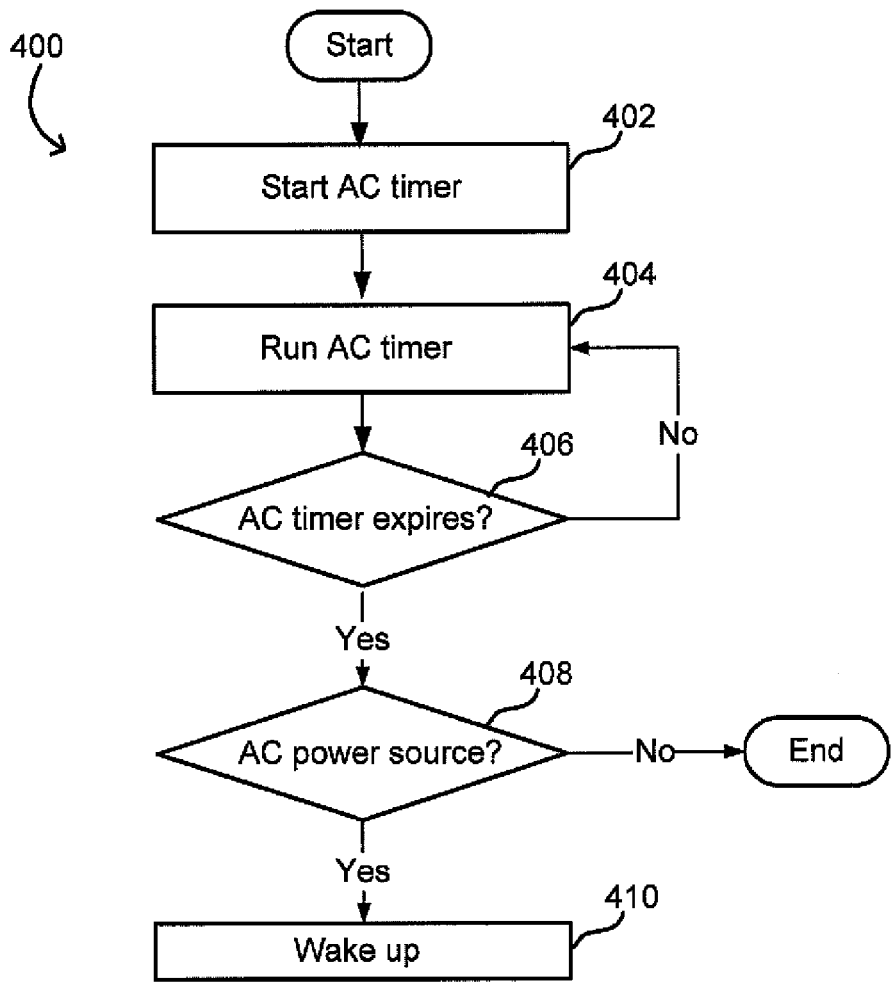
FIGS. 4 and 5 are flowcharts of a process of operating a computing device using timers each associated with a power state according to some embodiments of the invention.
Figure 5:
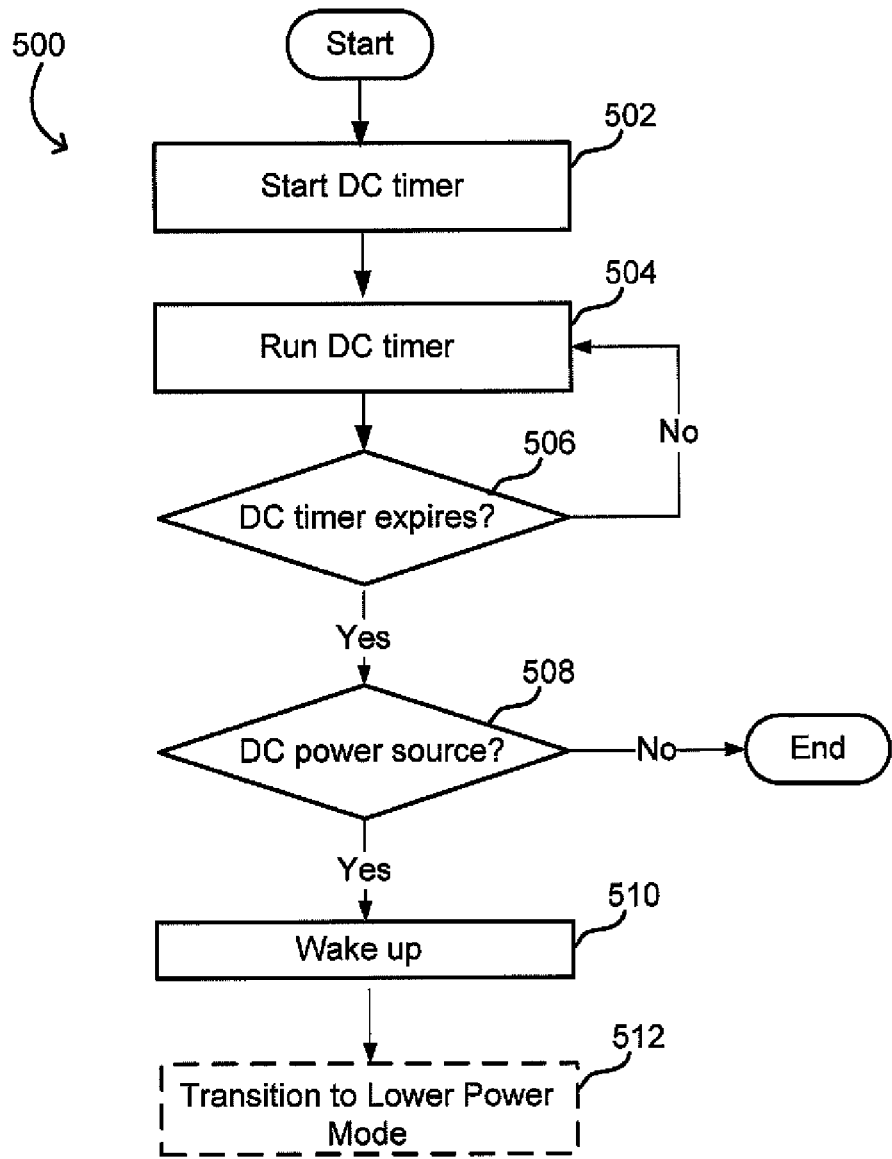

FIGS. 4 and 5 illustrate a process of operating a computing device using timers each associated with a power state according to some embodiments of the invention. In FIG. 4, a process 400 may start at any suitable time but, for example, may begin in response to a command to set wake-up behavior conditioned on the device being powered from an AC source at wake-up. Any suitable trigger may start process 400. In some embodiments, process 400 may start when the computing device transitions to a sleep mode. Process 400 may then follow to block 402 where an AC timer may be started. Further, the computing device may run the AC timer, as shown in block 404.

In decision block 406, it may be determined whether the AC timer has expired, or timed-out. For this purpose, a current time of the computing device (e.g., provided by the RTC) may be compared to a value of the AC timer defined in any suitable format. For example, as shown in FIG. 3, the AC timer may be defined as a number of seconds from the start to the expiration of the timer. When it is determined in decision block 406 that the AC timer has not expired, process 400 may return to block 404 where the AC timer may continue operating.

When it is determined in decision block 406 that the AC timer has expired, process 400 may branch to decision block 408 where it may be determined whether the computing device is currently using an AC power supply. As discussed above, a power supply controller may provide information of a presence or absence of the AC power state. When the computing device is currently operating using the AC power source, the computing device may be instructed to wake up at block 410. Waking up of the computing device may comprise transitioning of any suitable component(s) of the device such as the CPU, a subset of the CPU, a platform chipset, or other circuit(s) to a wake-up mode. Thus, when the AC timer is expired and a current power state of the device matches the power state associated with the AC timer (i.e., the AC power state), the computing device may enter the wake-up mode. Otherwise, when it is determined in block 408 that the current power state and the power state associated with the AC timer do not match, the process may end. Any suitable method may be implemented when the current power state and the power state associated with the AC timer do not match as embodiments of the invention are not limited in this respect. For example, the AC timer may then be reset, at block 402.

In FIG. 5, a process 500 may start at any suitable time but, for example, may begin in response to a command to set wake-up behavior conditioned on the device being powered from a DC source at the wake-up time. Any suitable trigger may start process 500. In some embodiments, process 500 may start when the computing device transitions to a sleep mode. In addition, in scenarios where the computing device may be placed into sleep modes of progressively lower power modes, process 500 may start when the computing device first transitions to a sleep mode. Process 500 may then follow to block 502 where a DC timer may be started. Further, the computing device may run the DC timer) as shown in block 504.

In decision block 506, it may be determined whether the DC timer has expired, or timed-out. For this purpose, a current time of the computing device (e.g., provided by the RTC) may be compared to a value of the DC timer defined in any suitable format. For example, as shown in FIG. 3, the DC timer may be defined in a number of seconds from the start to the expiration of the timer. When it is determined in decision block 506 that the DC timer has not expired, process 500 may return to block 504 where the DC timer may continue operating.

When it is determined in decision block 506 that the DC timer has expired, process 500 may branch to decision block 508 where it may be determined whether the computing device is currently using a DC power supply. As discussed above, a power supply controller may provide information of a presence or absence of the DC power state. When the computing device is currently operating using the DC power source, the computing device may be instructed to wake up at block 510. Waking up of the computing device may comprise transitioning of any suitable component(s) of the device such as the CPU, a subset of the CPU, a platform chipset, or other circuit(s) to a wake-up mode. Thus, when the DC timer is expired and a current power state of the device matches the power state associated with the DC timer (i.e., the DC power state), the computing device may enter the wake-up mode. Otherwise, when it is determined in block 508 that the current power state and the power state associated with the DC timer do not match, the process may end. Any suitable method may be implemented when the current power state and the power state associated with the DC timer do not match as embodiments of the invention are not limited in this respect. For example, the DC timer may then be reset, at block 502.

As discussed above, computing devices may implement different sleep levels, with successively more components turned off in each deeper sleep mode. Thus, a computing device may be placed in different power modes which may provide different levels of saving power. FIG. 5 shows that the computing device wakes up at block 510 the device may then transition to a lower power mode at block 512. This may happen, for example, when the computing device is a laptop operating on a battery and placed in a sleep mode (i.e., a low power mode) to save battery power. When the laptop in the low power mode has not been in use for a certain amount of time, it may wake up to transition to a lower power mode to further save battery power.

It should be appreciated that processes shown in FIGS. 4 and 5 may be performed simultaneously or in any other suitable order. Thus, the DC and AC timer may be initialized at the same time when the computing device transitions to a sleep mode. Also, the timers may be started at any other suitable time.

Figure 6:
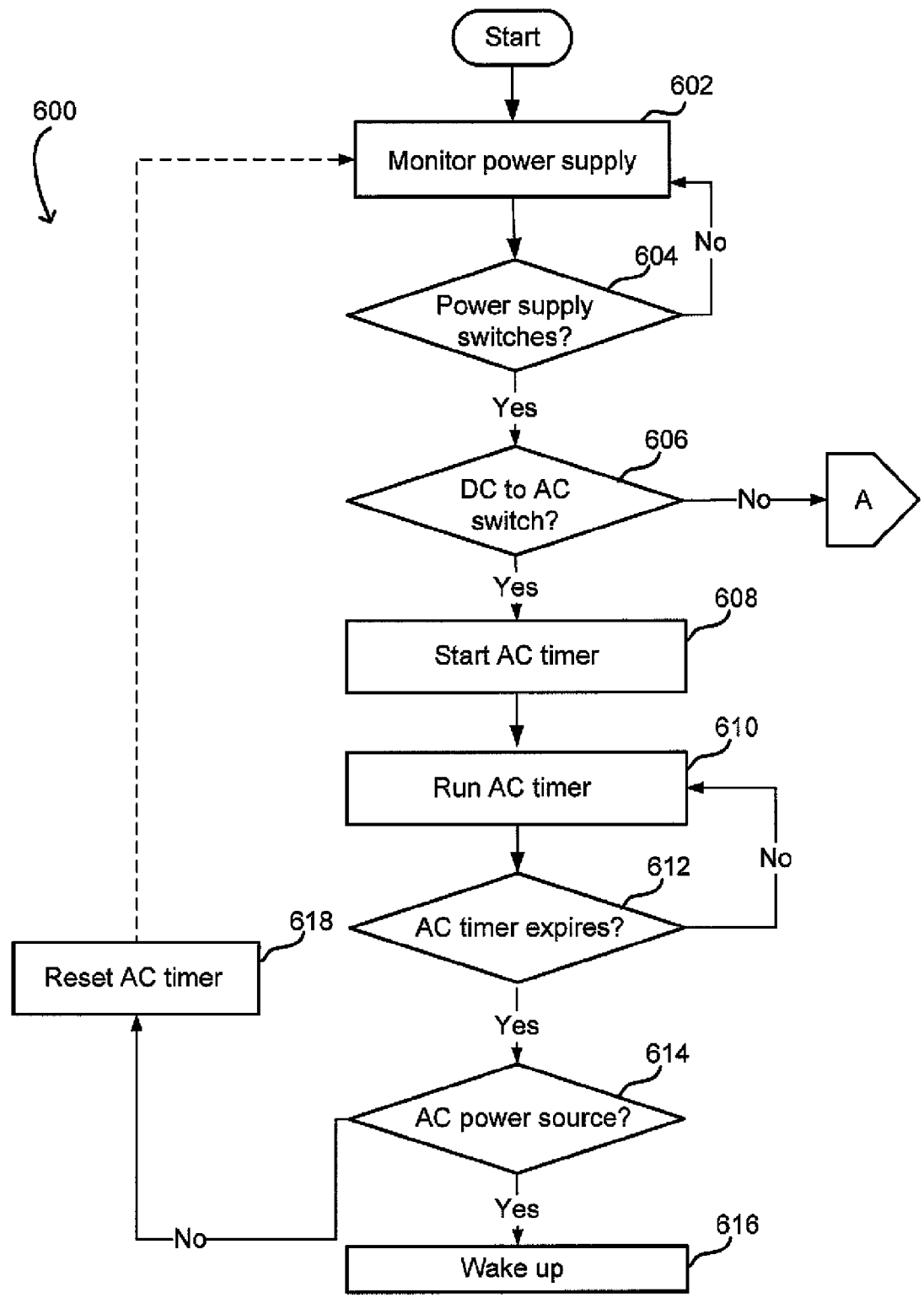
FIGS. 6 and 7 are flowcharts of another process of operating a computing device using timers each associated with a power state according to some embodiments of the invention.
Figure 7:
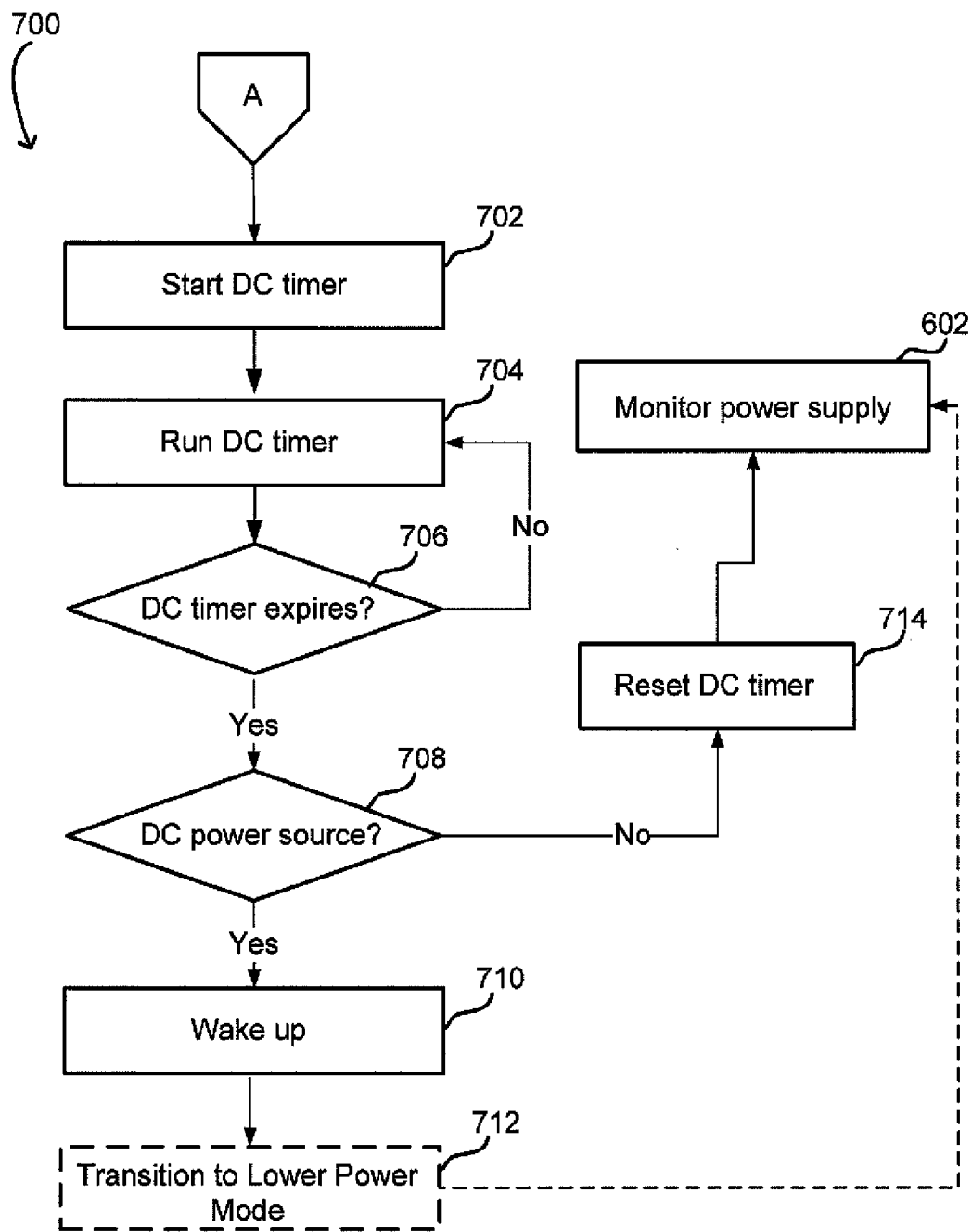

FIGS. 6 and 7 illustrate a process of operating a computing device using timers each associated with a power state according to some embodiments of the invention. In FIG. 6, a process 600 may start at any suitable time but, for example, may begin in response to a command to set wake-up behavior. At block 602, current power state may be monitored via, for example, a power supply controller providing information of a power source currently in use. In decision block 604, it may be determined whether the current power supply switches from one source to another. For example, the computing device operating on an AC power supply may start operating on a battery instead. When it is determined that the current power supply switches, process 600 may continue to decision block 606 where it may be determined whether the current power source of the device has switched from a DC to AC power source. When it is determined that the current power supply has not switched, process 600 may return to block 602 to continue monitoring a current power supply.

When it is determined at block 606 that the current power source of the device has switched from the DC to AC power source, the process may branch to block 608 where an AC timer may be started. When it is determined that the current power source of the device has not switched from the DC to AC power source, which, in this example, indicates that the current power source has switched from the AC to DC power source, process 600 may follow to FIG. 7, as shown by a reference element "A" in FIG. 6. The AC timer may be programmed upon a request from any suitable component of the OS or from one or more software applications or a user, as described above.

The AC timer may then count, as shown in block 610. In decision block 612, it may be determined whether the AC timer has expired. For this purpose, a current time of the computing device (e.g., provided by the RTC) may be compared to a value of the AC timer defined in any suitable format. For example, as shown in FIG. 3, the AC timer may be defined in a number of seconds from the start to the expiration of the timer. When it is determined in decision block 612 that the AC timer has not expired, process 600 may return to block 610 where the AC timer may continue operating.

When it is determined in decision block 612 that the AC timer has expired, process 600 may continue to decision block 614 where it may be determined whether a current power state of the computing device is an AC power supply. As discussed above, a power supply controller may provide information of a presence or absence of the AC power supply. When the computing device is currently operating using the AC power source, the computing device may be instructed to wake up at block 616. Waking up of the computing device may comprise transitioning of any suitable component(s) of the device such as the CPU, a platform chipset, or other circuit(s) to a wake-up mode. Thus, when the AC timer is expired and a current power state of the device matches the power state associated with the AC timer (i.e., the AC power state), the computing device may enter the wake-up mode. Otherwise, when it is determined in block 614 that the current power state and the power state associated with the AC timer (i.e., the AC power state) do not match, the AC timer may be reset, as shown in block 618. Process 600 may then return to block 602 to continue monitoring a current power supply, as shown in FIG. 6. It should be appreciated that process 600 is shown to first continue to block 608 by way of example only as the process may also follow to a process shown in FIG. 6.

FIG. 7 illustrates a process 700 that may start when it is determined at block 606 of FIG. 6 that the current power source of the device has switched from the AC to DC power source. For example, a mobile computing device such as a laptop (e.g., laptop 104 shown in FIGS. 1A and 1B) may be carried beyond the reach of an AC power supply and placed in a sleep mode while operating on a DC battery power supply. Next, process 700 may follow to block 702 where a DC timer may be started. As discussed above, the DC timer may be generated upon a request from any suitable component of the OS or from one or more software application. In addition, in some embodiments, a user may request establishing a wake-up behavior for an application or a component within the OS. Further, the computing device may run the DC timer, as shown in block 704. In decision block 706, it may be determined whether the DC timer has expired, or timed-out. For this purpose, a current time of the computing device (e.g., provided by the RTC) may be compared to a value of the DC timer defined in any suitable format. For example, as shown in FIG. 3, the DC timer may be defined in a number of seconds from the start to the expiration of the timer. When it is determined in decision block 706 that the DC timer has not expired, process 700 may return to block 704 where the DC timer may continue operating.

When it is determined in decision block 706 that the DC timer has expired, process 700 may branch to decision block 708 where it may be determined whether the computing device is currently using a DC power supply. As discussed above, a power supply controller may provide information of a presence or absence of the DC power state. When the computing device is currently operating using the DC power source, the computing device may be instructed to wake up at block 710. Waking up of the computing device may comprise transitioning of any suitable component(s) of the device such as the CPU, a subset of the CPU, a platform chipset, or other circuit(s) to a wake-up mode. Thus, when the DC timer is expired and a current power state of the device matches the power state associated with the DC timer (i.e., the DC power state), the computing device may enter the wake-up mode. Otherwise, when it is determined in block 708 that the current power state and the power state associated with the DC timer do not match, the DC timer may be reset, or restarted, as shown in block 714. Process may then return to block 602 to continue monitoring a current power supply.

As discussed above, a computing device, particularly, a mobile computing device operating on a battery and placed in a sleep mode (i.e., a low power mode) to reduce its power consumption, may be instructed to wake up to transition another sleep mode which is a lower power mode, to further reduce its power consumption and save battery life. Thus, FIG. 7 illustrates that after waking up the computing device at block 710 process 700 may follow to an optional block 712 where the computing device may transition to a lower power mode. For example, in embodiments of the invention employing the ACPI specification the computing device may enter one of several known graduated power levels determined by the ACPI. Process 700 may then return to block 602 to continue monitoring a current power supply.

According to some embodiments of the invention, a timer associated with a power state may be started when a current power state of a computing device changes to the power state associated with the timer. However, if the current power state switches from the power state associated with the timer to another power state during the operation of the timer, the timer may be stopped until the current power state of the computing device switches back to the power state associated with the timer.

Figure 8:
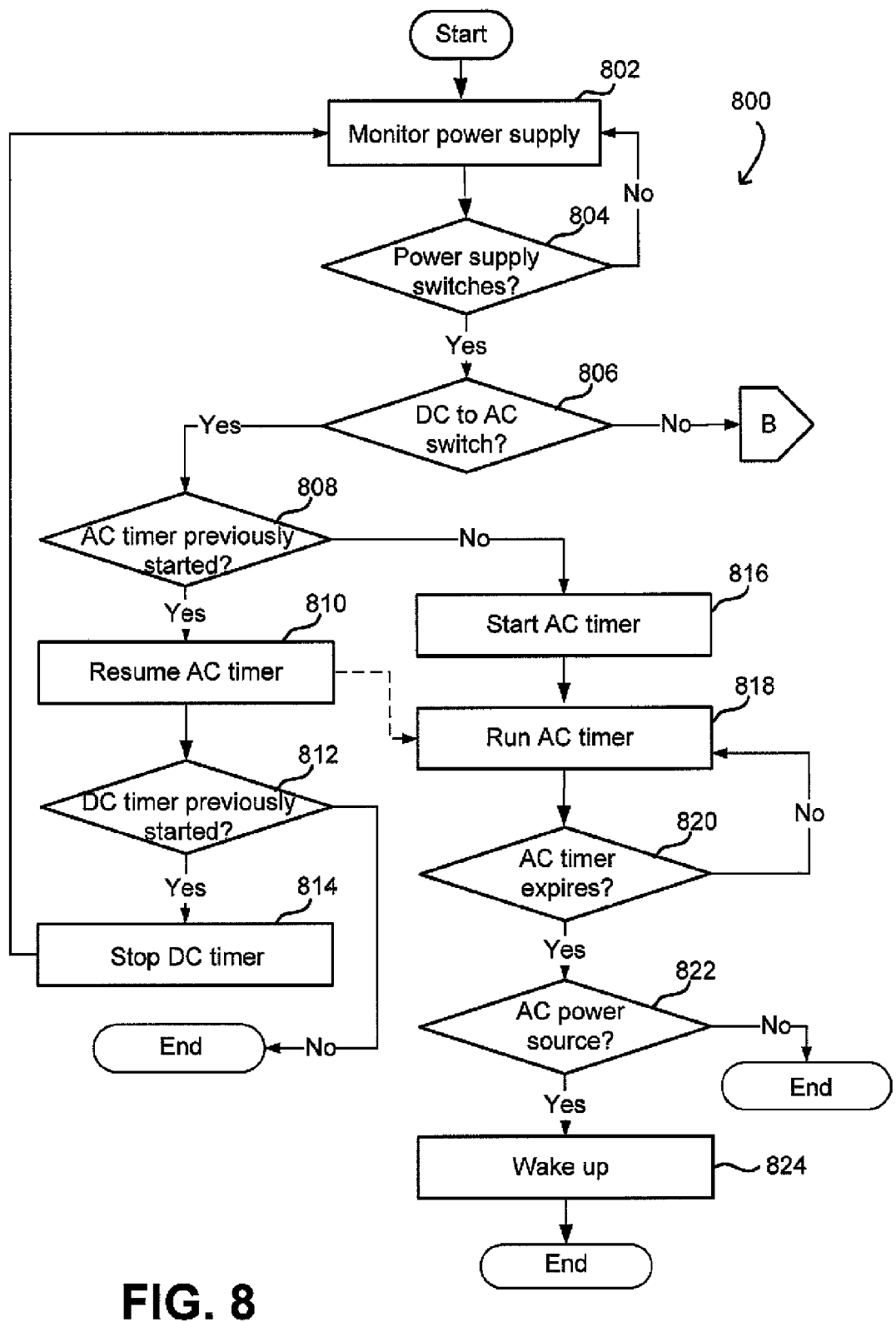
FIGS. 8 and 9 are flowcharts of another process of operating a computing device using timers each associated with a power state according to some embodiments of the invention.
Figure 9:
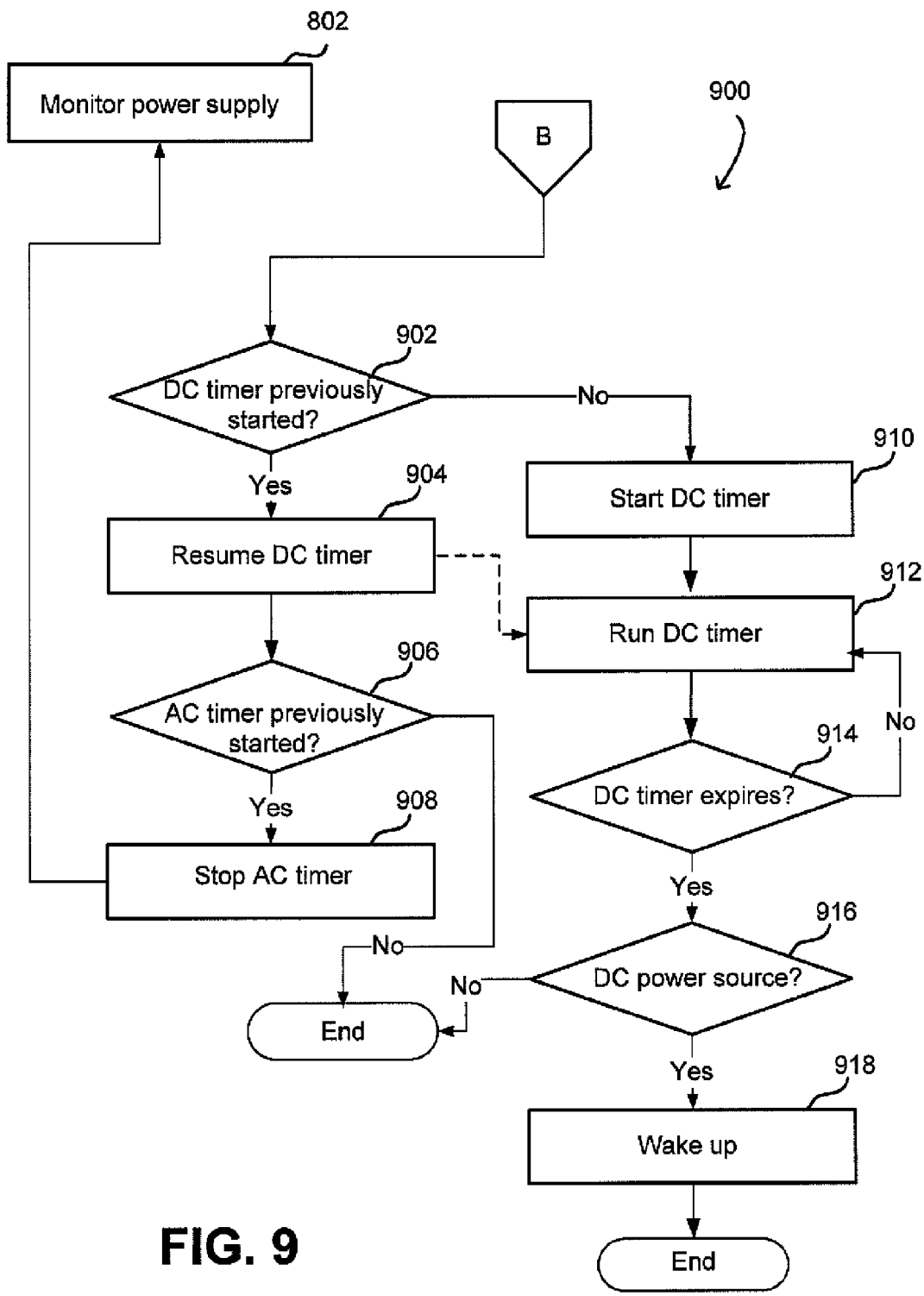

FIGS. 8 and 9 illustrate another embodiment of the invention implementing adaptive managing of wake up of a computing device using one or more timers each associated with a power state. In FIG. 8, process 800 may start at any suitable time. At block 802, a current power supply may be monitored to determine a current power state of the computing device. In decision block 804, it may be determined whether the current power supply switches from one source to another and a power state of the device has thus changed. For example, the computing device operating on an AC power supply may start operating on a battery instead. When it is determined at block 804 that the current power supply has not switched, process 800 may return to block 802 to continue monitoring the power supply to determine a current power state of the computing device. When it is determined at block 804 that the current power supply switches, process 800 may continue to decision block 806 where it may be determined whether the current power source of the device has switched from a DC to AC power source. If it is determined that the current power source of the device has not switched from the DC to AC power source, which, in this example, indicates that the current power source has switched from the AC to DC power source, process 800 may follow to FIG. 9, as shown by a reference element "B" in FIG. 8.

When it is determined at block 806 that the current power source of the device has switched from the DC to AC power source, process 800 may branch to block 608 where it may determined whether an AC timer has been previously started. As discussed above, in some embodiments of the invention, a timer such as the AC timer associated with an AC power state of the device may stop running when a current power state of the device switches from the AC power state to a DC power state during operation of the AC timer. Thus, when it is determined at block 808 that the AC timer has been previously started and therefore has subsequently been stopped when the power state switched, process 800 may branch to block 810 where the AC timer may resume running. Process 800 may optionally run the resumed AC timer at block 818, as shown in FIG. 8.

Next, at block 812, it may be determined whether a DC timer has been previously started. Since it has been determined at block 806 that the current power source of the device has switched from the DC to AC power source and the computing device is operating using the AC power source, the DC timer that has been previously started may be stopped until the power state of the device switches back to the DC power. Thus, when it is determined that the DC timer has been previously started, process 800 may continue to block 814 where the DC timer may be stopped. Process 800 may return to block 802 where the power supply may be monitored. It should be appreciated that process 800 may be a continuous process and, for example, after the AC timer has been resumed at block 810, process 800 may also return to block 802 where the power supply may be monitored. When it is determined at block 812 that the DC timer has not been previously started, process 800 may end, as shown in FIG. 8.

FIG. 8 shows that when it is determined at block 808 that the AC timer has not been previously started, process 800 may proceed to block 816 where an AC timer may be started. The AC timer may be generated upon a request from any suitable component of the OS or from one or more software applications, as described above. In addition, in some embodiments, a user may request establishing a wake-up behavior for an application or a component within the OS. The OS (e.g., the OSPM) may program the timer in response to the request and the timer may then be translated (e.g., by an APCI interpreter) to a command to a hardware component such as an embedded controller. Next, the computing device may run the AC timer, as shown in block 818. In decision block 820, it may be determined whether the AC timer has expired. For this purpose, a current time of the computing device (e.g., provided by the RTC or any other suitable component) may be compared to a value of the AC timer defined in any suitable format. For example, as shown in FIG. 3, the AC timer may be defined in a number of seconds from the start to the expiration of the timer. When it is determined in decision block 820 that the AC timer has not expired, process 800 may return to block 818 where the AC timer may continue running.

When it is determined in decision block 820 that the AC timer has expired, process 800 may continue to decision block 822 where it may be determined whether the computing device is currently using an AC power source. As discussed above, a power supply controller may provide information of a presence or absence of the AC power source for the device. When the computing device is currently operating using the AC power source, the computing device may be instructed to wake up at block 824. Waking up of the computing device may comprise transitioning of any suitable component(s) of the device such as the CPU, a platform chipset, or other circuit(s) to a wake-up mode. Thus, when the AC timer is expired and a current power state of the device matches the power state associated with the AC timer (i.e., the AC power state), the computing device may enter the wake-up mode. Process 800 may then end. When it is determined in block 822 that the current power state and the power state associated with the AC timer (i.e., the AC power state) do not match, process 800 may end, as shown in FIG. 8. In addition, process 800 may return to block 802 to continue monitoring a current power supply.

FIG. 9 illustrates a process 900 that may start when it is determined at block 806 of FIG. 8 that the current power source of the device has switched from the AC to DC power source. Process 900 may follow to block 902 where it may be determined whether a DC timer has been previously started. As discussed above, in some embodiments of the invention, a timer such as a DC timer associated with a DC power state of the device may stop running when a current power state of the device switches from the DC power state to an AC power state during operation of the DC timer. Thus, when it is determined at block 902 that the DC timer has been previously started and therefore has subsequently been stopped when the power state switched, process 900 may branch to block 904 where the DC timer may resume running. Furthermore, process 900 may optionally run the resumed DC timer at block 912, as shown in FIG. 9.

Next, at block 906, it may be determined whether an AC timer has been previously started. Since it has been determined at block 806 of FIG. 8 that the current power source of the device has switched from the AC to DC power source and the computing device is operating using the DC power source such as a battery, the AC timer that has been previously started may be stopped until the power state of the device switches back to the AC power. Thus, when it is determined at block 906 that the AC timer has been previously started, process 900 may continue to block 908 where the AC timer may be stopped. Process 900 may then return to block 802 of FIG. 8 where the power supply may be monitored. It should be appreciated that process 900 may be a continuous process and, for example, after the DC timer has been resumed at block 904, process 900 may also return to block 802 where the power supply may be monitored. When it is determined at block 906 that no AC timers have been previously started, process 900 may end, as shown in FIG. 9.

FIG. 9 shows that when it is determined at block 902 that the DC timer has not been previously started, process 900 may proceed to block 910 where a DC timer may be started. The DC timer may be generated upon a request from any suitable component of the OS or from one or more software applications, as described above. In addition, in some embodiments, a user may request establishing a wake-up behavior for an application or a component within the OS. The OS (e.g., the OSPM) may program the timer in response to the request and the timer may then be translated (e.g., by an APCI interpreter) to a command to a hardware component such as an embedded controller. Next, the computing device may run the DC timer, as shown in block 912. Next, in decision block 914, it may be determined whether the DC timer has expired. For this purpose, a current time of the computing device (e.g., provided by the RTC or any other suitable component) may be compared to a value of the DC timer defined in any suitable format. For example, as shown in FIG. 3, the DC timer may be defined in a number of seconds from the start to the expiration of the timer. When it is determined in decision block 914 that the DC timer has not expired, process 900 may return to block 912 where the DC timer may continue running.

In this example, when it is determined in decision block 914 that the DC timer has expired, process 900 may continue to decision block 916 where it may be determined whether the computing device is currently using a DC power source. As discussed above, a power supply controller may provide information of a presence or absence of the DC power source for the device. When the computing device is currently operating using the DC power source, the computing device may be instructed to wake up at block 918. Waking up of the computing device may comprise transitioning of any suitable component(s) of the device such as the CPU, a platform chipset, or other circuit(s) to a wake-up mode. Thus, when the DC timer is expired and a current power state of the device matches the power state associated with the DC timer (i.e., the DC power state), the computing device may enter the wake-up mode. Process 900 may then end. When it is determined in block 916 that the current power state and the power state associated with the DC timer (i.e., the DC power state) do not match, process 900 may end, as shown in FIG. 9. In addition, process 900 may return to block 802 to continue monitoring a current power supply.

It should be appreciated that though processes shown in FIGS. 4-9 illustrate two types of timers, the AC and DC timers, other suitable timers may be used to define, in response to requests from an OS or applications, wake-up behavior of components(s) of a computing device based on a power state of the device. For example, a timer may be defined that determines transitioning of the computing device into a wake-up mode regardless of a current power state of the device. Furthermore, various timers may be associated with different level of the AC and DC power states of the device as well as combinations of the AC and DC power states.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of including, "comprising," or "having," "containing," "involving," and variations thereof herein, is meant to encompass the items listed thereafter and equivalents thereof as well as additional items.

What is claimed is:

1. A method of operating a computing device comprising a plurality of timers each associated with a power state, the method comprising:
    setting a first timer of the plurality of timers associated with a first power state, the first timer being configured, upon expiration, to cause the computing device to transition to a wake-up mode if a current power state of the computing device and the first power state match;
    setting a second timer of the plurality of timers associated with a second power state, the second timer being configured, upon expiration, to cause the computing device to transition to the wake-up mode if the current power state of the computing device and the second power state match;
    when the first timer expires:
        if the current power state of the computing device and the first power state match, causing the computing device to transition to the wake-up mode; and
        if the current power state of the computing device and the first power state do not match, resetting the first timer without causing the computing device to transition to the wake-up mode; and
    when the second timer expires:
        if the current power state of the computing device and the second power state match, causing the computing device to transition to the wake-up mode; and
        if the current power state of the computing device and the second power state do not match, resetting the second timer without causing the computing device to transition to the wake-up mode.

2. The method of claim 1, wherein:
    the first power state comprises an AC power state and the first timer comprises a timer that causes the computing device to transition to the wake-up mode if the computing device is operating using an AC power source; and
    the second power state comprises a DC power state and the second timer comprises a timer that causes the computing device to transition to the wake-up mode if the computing device is operating using a DC power source.

3. The method of claim 1, wherein the computing device transitions to the wake-up mode from a first sleep mode to transition to a second sleep mode.

4. The method of claim 3, wherein the second sleep mode comprises a state wherein the computing device consumes less power than when in the first sleep mode.

5. The method of claim 1, wherein the first and second timers are virtual timers based on a same physical timer.

6. The method of claim 1, wherein setting the first and second timers comprises issuing commands through an Advanced Configuration and Power Interface (ACPI).

7. The method of claim 1, wherein the first and second timers are used to control operation of a Real-Time Clock (RTC) alarm.

8. The method of claim 1, wherein the first and second timers are set when the computing device transitions to a sleep mode.

9. The method of claim 1, further comprising:
when the first timer is set and a power source of the computing device switches from the first power source to the second power source, stop operating the first timer until the power source switches from the second power source to the first power source; and
when the second timer is set and the power source switches from the second power source to the first power source, stop operating the second timer until the power source switches from the first power source to the second power source.

10. The method of claim 1, further comprising, in response to resetting the first timer or the second timer, causing the computing device to transition to a low-power mode.

11. A computing device configured to operate using multiple power sources, the device comprising:
a controller that selectively resets timers and that is adapted to conditionally cause the computing device to transition to a wake-up mode; and
a plurality of timers,
a first one of the plurality of timers being associated with a first power state and being configured, upon expiration, to cause the controller to cause computing device to transition to the wake-up mode, if a current power state of the computing device and the first power state match, and
a second one of the plurality of timers being associated with a second power state and being configured, upon expiration, to cause the controller to cause the computing device to transition to the wake-up mode if the current power state of the computing device and the second power state match;
wherein, when the first one of the plurality of timers expires:
if the current power state of the computing device and the first power state match, the controller causes the computing device to transition to the wake-up mode; and
if the current power state of the computing device and the first power state do not match, the controller resets the first one of the plurality of timers without causing the computing device to transition to the wake-up mode; and
wherein, when the second one of the timers expires:
if the current power state of the computing device and the second power state match, the controller causes the computing device to transition to the wake-up mode; and
if the current power state of the computing device and the second power state do not match, the controller resets the second one of the plurality of timers without causing the computing device to transition to the wake-up mode.

12. The method of claim 11, wherein:
the first power state comprises an AC power state and the first one of the plurality of timers comprises a timer that causes the computing device to transition to the wake-up mode if the computing device is operating using an AC power source; and
the second power state comprises a DC power state and the second one of the plurality of timers comprises a timer that causes the computing device to transition to the wake-up mode if the computing device is operating using a DC power source.

13. The method of claim 11, wherein the computing device transitions to the wake-up mode from a first sleep mode to transition to a second sleep mode.

14. The method of claim 13, wherein the second sleep mode comprises a state wherein the computing device consumes less power than when in the first sleep mode.

15. The method of claim 11, wherein at least one of the first and second ones of the plurality of timers are virtual timers based on a same physical timer.

16. The method of claim 11, wherein at least one of the first and second ones of the timers are set via commands through an Advanced Configuration and Power Interface (ACPI).

17. The method of claim 11, wherein the first and second ones of the plurality of timers are used to control operation of a Real-Time Clock (RTC) alarm.

18. The method of claim 11, wherein the first and second ones of the plurality of timers are set when the computing device transitions to a sleep mode.

19. A storage device storing processing instructions that, when executed by one or more processors, cause the execution of a method of operating a computing device comprising a plurality of timers each associated with a power state, the method comprising:
setting a first timer of the plurality of timers associated with a first power state, the first timer being configured, upon expiration, to cause the computing device to transition to a wake-up mode if a current power state of the computing device and the first power state match;
setting a second timer of the plurality of timers associated with a second power state, the second timer being configured, upon expiration, to cause the computing device to transition to the wake-up mode if the current power state of the computing device and the second power state match;
when the first timer expires:
if the current power state of the computing device and the first power state match, causing the computing device to transition to the wake-up mode; and
if the current power state of the computing device and the first power state do not match, resetting the first timer without causing the computing device to transition to the wake-up mode; and
when the second timer expires:
if the current power state of the computing device and the second power state match, causing the computing device to transition to the wake-up mode; and
if the current power state of the computing device and the second power state do not match, resetting the second timer without causing the computing device to transition to the wake-up mode.

* * * * *